Figure 1:
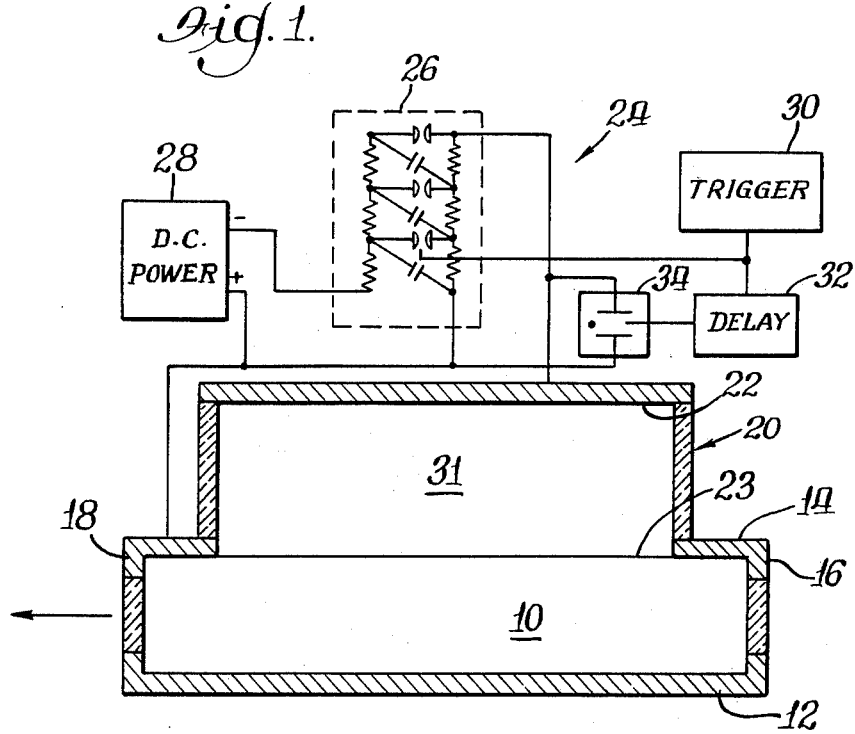

United States Patent [19]

Hunter, Jr. et al.

[11] 4,075,579

[45] Feb. 21, 1978

[54] GASEOUS LASER MEDIUM AND MEANS FOR EXCITATION

[75] Inventors: Robert O. Hunter, Jr., Irvine; Craig N. Howton, San Diego, both of Calif.

[73] Assignee: Maxwell Laboratories, Inc., San Diego, Calif.

[21] Appl. No.: 643,508

[22] Filed: Dec. 22, 1975

[51] Int. Cl.² .............................................. H01S 3/22
[52] U.S. Cl. .............................................. 331/94.5 G
[58] Field of Search ......................... 331/94.5; 330/4.3

[56] References Cited

U.S. PATENT DOCUMENTS 3,411,105   11/1968   Patel .............................. 331/94.5 G

OTHER PUBLICATIONS

Byer et al., Applied Physics Letters, vol. 20, No. 11, 1 June 1972, pp. 463–466.
West et al., J. of Chemical Physics, vol. 61, No. 11, 1 Dec. 1974, pp. 4700–4716.
Coxon et al., J. Chem. Phys., vol. 58, No. 6, 15 Mar. 1973, pp. 2244–2257.

*Primary Examiner*—William L. Sikes
*Attorney, Agent, or Firm*—Fitch, Even, Tabin & Luedeka

[57] ABSTRACT

A gaseous laser medium is photodissociated into an upper laser state by vacuum ultraviolet light from an electrically excited noble gas mixed with the laser medium. A gaseous laser medium, such as cyanogen bromide, is preferably resonantly excited by photodissociation by such vacuum ultraviolet light. CN particles in the B state undergo laser transition to the X state, producing radiation at about 4000A. Alternatively or additionally, a gaseous laser medium is excited to produce molecules, such as halogen molecules, particularly $Br_2$, in an upper laser state whence they undergo transition by laser action to a weakly bound lower laser state that is rapidly depopulated.

33 Claims, 2 Drawing Figures

GASEOUS LASER MEDIUM AND MEANS FOR EXCITATION

This invention relates generally to lasers, and particularly to visible and ultraviolet radiation gas lasers pumped by photodissociation, and still more particularly to such gas lasers pumped by vacuum ultraviolet radiation from rare gas excimers.

A laser in an optical device where light stimulates the emission of additional light reinforcing the original, producing a gain in light intensity as the light passes through the laser medium. Large pulses of coherent light have been produced by lasers and have many well-known applications. Gas lasers of relatively high efficiency have been made using noble gases, and a number of other gases have exhibited laser action. However, noble gas lasers do not operate efficiently in the visible or near ultraviolet part of the spectrum and hence have limited utility, for many applications of lasers require radiation in the visible or near ultraviolet where the radiation can be utilized and operated upon by ordinary optical means. The noble gas excimers, on the other hand, lase in the vacuum ultraviolet range to which glass and quartz and, indeed, air are opaque. Other gas lasers have been relatively inefficient and/or also lase at unsuitable wavelengths.

It has been known to excite lasers with vacuum ultraviolet radiation and dissociate laser media using vacuum ultraviolet radiation. However, such lasers have required special techniques to enable the ultraviolet radiation to reach the laser medium, and have resulted in loss of efficiency in the transfer of vacuum ultraviolet radiation. As an extremely important criterion of a laser is its efficiency, it is an important object of the present invention to provide a laser of high efficiency.

In accordance with one aspect of the invention, noble gas is mixed with a gaseous laser medium in a laser chamber. This places the noble gas in close optical coupling with the laser medium and provides a most efficient transfer of energy from the noble gas to the laser medium. The noble gas is maintained at a relatively high pressure, as from 0.5 to 10 atmospheres, and preferably from 1 to 5 atmospheres. The pressure should be relatively high to assure the formation of a substantial amount of continuum vacuum ultraviolet radiation, such radiation being produced by the excitation of the noble gas by high speed electrons as occasioned by an electron gun or by an electrical discharge through the gas and subsequent reactions leading to the emitting state. On the other hand, if the pressure is made too great, the excited noble gas particles deactivate themselves uselessly.

The laser medium is added in quantity sufficient to absorb the vacuum ultraviolet radiation efficiently from the noble gas before the radiation strikes the walls of the confining chamber and is wasted. At the same time, the laser medium must not be present to such an extent as to poison the system by removing the electron energy without its exciting the noble gas, thus further impairing efficiency. The partial pressure of the laser medium should be from about 0.01 to 1% of the partial pressure of the noble gas and may be from 0.5 to 10 torr, preferably 1 to 5 torr.

Under these conditions, the noble gas may be very efficiently excited, with an efficiency as great as 50%. That is, as much as 50% of the input electrical energy may go into the excitation of the noble gas to an excited level whence the noble gas radiates in the vacuum ultraviolet. This ultraviolet radiation is efficiently coupled to the laser medium because of the intimate contact between the gases.

Another aspect of the present invention achieves high efficiency by the resonant coupling of the vacuum ultraviolet radiation to the laser medium. In such transfer of energy, the vacuum ultraviolet radiation photodissociates the laser molecules to produce particles directly excited to an upper laser state, from which the particles undergo transition by laser action to a lower laser state. As is well known, electromagnetic radiation can be absorbed by material in a number of modes. However, it is only that energy that goes to produce excitation to the desired upper laser state that is useful. Even then, greater efficiency is achieved when the energy is coupled directly into the upper laser state, for energy is lost in making intervening transitions.

In accordance with this aspect of the present invention, a laser medium is selected which, upon photodissociation, produces a particle which requires, for excitation to the desired upper laser state, photon energy of vacuum ultraviolet radiation above the binding energy of the molecules of the laser medium and their photofragment excitation energy. That is, each photon of ultraviolet radiation striking a molecule of the laser medium may cause the medium to photodissociate by breaking an intramolecular bond. This requires a certain amount of the photon energy. The remainder is available to excite at least one of the particles of dissociation. If the energy required to excite the particles to its upper laser state is close the energy available, the energy may be directly transferred to the excitation of the particle, without being consumed by the other, and therefore wasteful, transitions. Further, because the excited particle itself is the result of photodissociation, the resonance is not critical, as excess energy may be transferred into kinetic energy of the resulting particles. This is significant because the wavelength of the vacuum ultraviolet radiation from the noble gas is not a sharp line but may be spread over, typically, 150A, so that absorption into bound molecules exhibiting line spectra is ordinarily inefficient as only a small fraction of the energy present can be absorbed. However, in the present instance, the photodissociated fragments may absorb energy above that needed for photodissociation and excitation, thus providing a mechanism for efficiently accommodating the excess photon energy in a resonant coupling for exciting the particle.

This resonant coupling achieves high efficiency, which is important not only from an energy standpoint, but also in establishing laser conditions. For laser operation, it is necessary to produce a population inversion where the particles are exited to an upper laser state in preference to the lower laser state. The upper laser state is transient, so the particles do not remain long in the upper laser state, and it is therefore essential to establish the population inversion rapidly so that laser action may be initiated, and initiated before the excitation energy is dissipated. With the efficiency with which energy is transferred, in accordance with the present invention, to excitation of the particles, it is possible to produce the population inversion necessary for laser action.

As one example, argon at approximately 7 atmospheres was mixed with cyanogen bromide at a few torrs. The argon was excited by pulses of electrons in an electron beam, producing vacuum ultraviolet radiation at a wavelength of about 1250A with a bandwidth of about 150A. This radiation photodissociated the cyanogen bromide, producing both CN and $Br_2$ in excited upper laser states. In the case of the CN laser, the excitation arose directly from the photodissociation process, without intermediate collisional reaction to lower the efficiency of the energy transfer. The excited CN then underwent laser action, as demonstrated by the temporal and spectral characteristics of the resulting radiation, which was at a number of wave lengths near 4000A, characteristic of transitions of excited CN from the B state to the X state. The laser action of cyanogen is particularly useful, as radiation of these wavelengths find particular application in the separation of uranium isotopes.

Similar excitation of the CN has also been achieved by the photodissociation of cyanogen chloride.

In addition to the direct resonant excitation of cyanogen, the photodissociation of cyanogen bromide in the above example produced bromine molecules excited to an upper laser state, whence the bromine underwent transitions by observed laser action to a weakly bound lower laser state, producing radiation at a wave length of about 2900A, characteristic of transitions of excited $Br_2$ from the E state to the B state. This lower laser state promptly and spontaneously went to an unbound ground state, apparently by collisionally induced predissociation. Such spontaneous unbinding assures population inversion, making the bromine thus excited an efficient laser. Thus, another aspect of the invention is to provide a gas laser wherein halogen molecules, particularly bromine molecules, are excited to an upper laser state whence they go by laser action to a lower laser state that is weakly bound and then promptly undergo spontaneous transition to an unbound ground state, as by collisionally induced predissociation. Other such prompt, spontaneous unbinding may be by the processes of fast vibrational relaxation or immediate direct dissociation. In any such event, the lower laser level is never very full, permitting efficient laser action.

Alternatively, the excited atoms or molecules may bind with the noble gas to form a molecule suitable for lasing.

Jeffers, et al. U.S. Pat. No. 3,882,414 discloses a gas laser having a mixture of noble gas and a halide gas excited by an electrical discharge. On the other hand, Jeffers, et al. provide for collisional dissociation of halide rather than photodissociation, as in the present invention. Jeffers, et al. make no mention of photodissociation, which is obviously relatively inefficient and ineffective under the conditions established by them, if indeed it occurs at all. Photodissociation has particular advantages in resonant excitation, providing relatively high efficiency. Further, the laser emission in Jeffers, et al. is from an atomic halogen, notable fluorine, rather than from the molecular form, producing radiation in an entirely different range. Still further, Jeffers, et al. operate at pressures of about a torr rather than near atmospheric and the ratio of the gases is much different. The higher pressure in the noble gas permits higher efficiency in introducing electrical energy. Nor does Jeffers, et al. suggest laser transition to a lower laser state that is promptly and spontaneously depopulated. The present invention, therefore, is a vast improvement over Jeffers, et al., providing for the relatively efficient and effective photodissociation of the laser medium, particularly by direct resonant excitation, and in producing a new halide laser where halogen molecules undergo laser action to a lower laser state that goes to an unbound state promptly and spontaneously.

Figure 2:
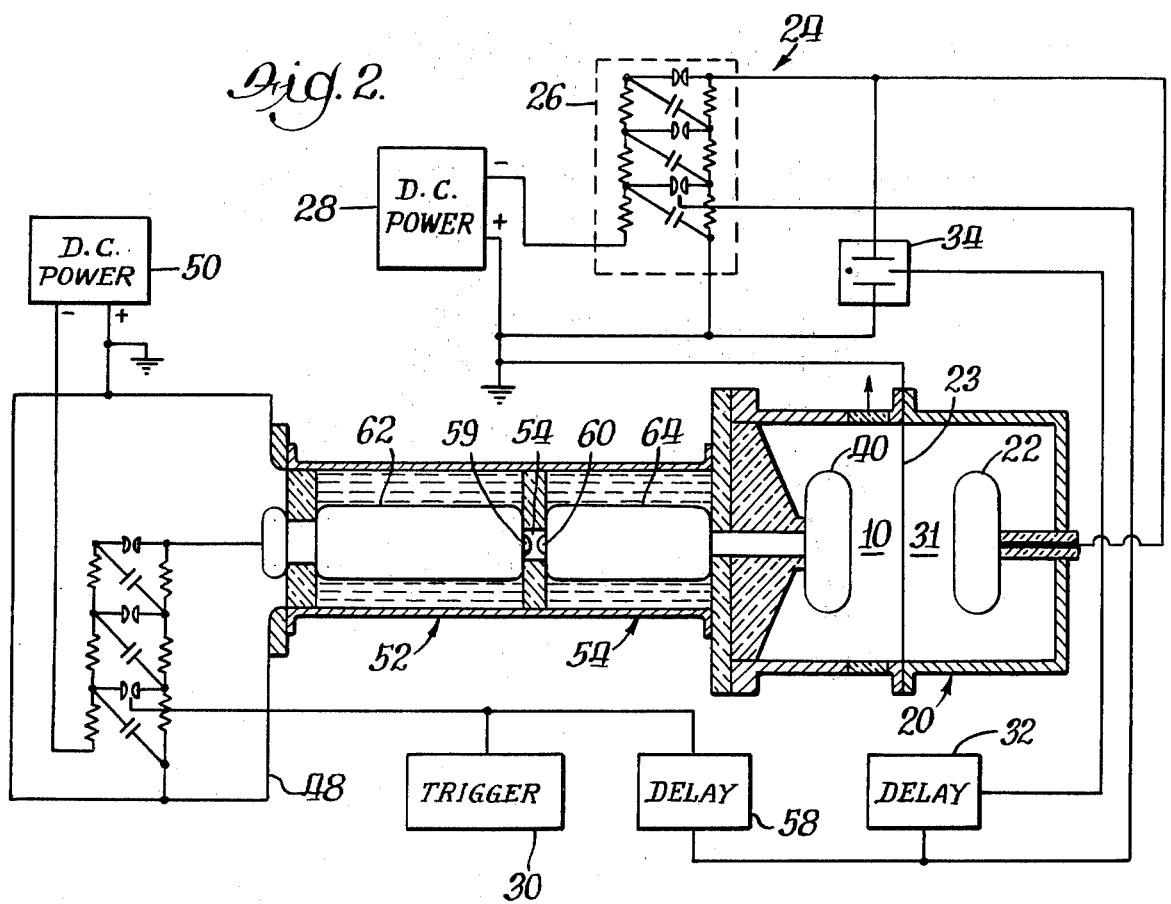

Other objects and advantages of the present invention will become apparent from the following detailed description, particularly when taken with the accompanying drawings in which:

FIG. 1 is a view, partly in section and partly diagrammatic, illustrating one form of the invention wherein the energy is provided by an electron beam; and FIG. 2 is a view, partly in section and partly diagrammatic, illustrating an alternative form of the invention wherein energy is provided by an electron-beam-controlled gas discharge.

In the apparatus as shown in FIG. 1, a laser chamber 10 is defined and confined by bottom and top walls 12 and 14, end walls 16 and 18, and front and back walls. The chamber may be substantially square in cross section with the direction between walls 16 and 18 being referred to as the axial direction. The chamber 10 is filled with a mixture of gases, one of which is a noble gas and the other of which is a gaseous laser medium. The noble gas is electrically excited by high-energy electrons produced by an electron gun 20. The electron gun 20 may be a cold cathode electron gun wherein electrons are extracted from a cathode 22 by field emission and are accelerated in a vacuum by an electric field produced by voltage applied between the cathode 22 and an anode 23. This voltage is applied by a power supply 24. In the particular circuit illustrated, the power supply 24 is a pulsed voltage source comprising a Marx tank 26. The Marx tank is charged from a d.c. power supply 28 and is controlled by trigger pulses from a trigger circuit 30. The trigger circuit produces pulses to actuate the Marx tank. These pulses may be periodic or at will of an operator. Each pulse is applied in a conventional manner to a discharge gap in the Marx tank 26, breaking down that gap and thence progressively the other discharge gaps in the Marx tank, thereby placing the capacitors of the Marx tank in series and applying a high voltage pulse between the anode 23 and the cathode 22 of the electron gun 20. This voltage produces the electric field for drawing electrons from the cathode 22 and accelerating them to high velocity through an evacuated region 31 to the anode 23. The anode is made in the form of a gas tight window in the wall 14 of the chamber 10. The window may be in the form of thin titanium foil supported by a grid to separate the evacuated region 31 of the electron gun 20 from the relatively high pressure gas in the chamber 10. The electrons are accelerated to sufficient energy as to penetrate the window with the loss of a relatively small portion of their energy.

The electrons, scattered by the foil anode 23, enter the chamber 10, where they ionize the gas therein, undergoing further scattering, producing many secondary electrons and exciting the noble gas to an excited state whence it returns to its ground state by the emission of radiation of characteristic wavelength in the vacuum ultraviolet.

The length of the pulse of radiation from the noble gas may be controlled by the length of time accelerating voltage is applied between the cathode 22 and the anode 23. To this end, each trigger pulse may be applied to a delay circuit 32 which provides a corresponding delayed pulse for turning off the beam. The delayed pulse may, as shown, be applied to a gas discharge tube 34 that shunts the output of the Marx tank 26. The delayed pulse breaks down the gap in the gas discharge tube 34, clamping the cathode 22 to the anode 23, deenergizing the electric field and turning off the electron gun. The delay may be adjusted to produce a pulse of electrons of the desired length.

The laser chamber 10 may be arranged in a conventional manner. In the apparatus as shown, the wall 16 has been fitted with an aluminum coated mirror surface, while the wall 18 has been fitted with a dielectric mirror providing 90% reflectivity at a wavelength of 3500A.

The device as illustrated has been operated with argon as the noble gas at a pressure of about 7 atmospheres and with the laser medium being cyanogen bromide (CNBr) or cyanogen chloride (CNCl) at a pressure of a few torrs. The dimensions of the chamber 10 were about 5 cm × 5 cm × 50 cm. The electron gun produced a pulsed electron beam at about 1000 kV and 50 kA with a pulse length of about 0.05 μsec. Laser action was thereupon effected in the laser medium in the axial direction. When the laser medium was cyanogen bromide, laser emission characteristic of B to X transitions in cyanogen, at the following wavelengths around 4000A, was observed by a spectrograph:

CN $B^2\Sigma^+ \rightarrow X^2\Sigma^+$ Transitions of CN

| Wave Length in A | | |
|---|---|---|
| 4216.0 | 4152.4 | 3909.5 |
| 4197.2 | 4078.7 | 3871.4 |
| 4181.0 | 4029.3 | 3861.9 |
| 4167.8 | 3984.6 | 3854.7 |
| 4158.1 | 3944.7 | |

Also observed was laser emission at wavelengths around 2900A, characteristic of E to B transitions in bromine molecules, this transition consisting of a series of diffuse lines not entirely resolved by the available spectrograph, the brightest regions being the following, calibrated to an accuracy of ±4A:

E→B Transitions of $Br_2$ Molecules

| Wave Length in A | | |
|---|---|---|
| | 2898.5 | 2859 |
| 2935.2 | 2883.6 | 2852 |
| 2928 | 2880 | 2840 |
| 2920 | 2872 | 2830 |
| 2916 | 2868 | 2820 |
| 2908 | 2863 | |

The operation of the apparatus of FIG. 1 is limited by the electron gun 20. For greater power, it is desirable to use the apparatus of FIG. 2 where additional power is supplied by an electrical discharge through the gas.

The apparatus of FIG. 2 may be similar to that of FIG. 1, but additionally includes a cathode 40 for effecting an electrical discharge transversely of the laser chamber 10. The electron beam from the electron gun 20 passes through the anode 23 into the laser chamber 10 pre-ionizing the gas and releasing secondary electrons in the chamber 10. The electrons in the chamber are then accelerated by a pulse of electrical potential applied between the cathode 40 and the anode 23, accelerating the electrons in the chamber 10 to sufficient energy that they may excite the noble gas contained in the chamber. In this form of the invention, a substantially greater amount of electrical energy may be coupled into the gas in the chamber 10, providing a substantially greater output without the limitations of the electron gun. Further, the accelerated electrons may further ionize the gas, producing additional ionization. On the other hand, the voltage applied across the chamber 10 is insufficient to cause the gas to break down. The electron gun may therefore be utilized to control the discharge. The electron beam from the electron gun 20 pre-ionizes the gas in the chamber 10 so as to permit a relatively uniform discharge through the chamber 10, exciting the contained noble gas relatively uniformly without producing a breakdown of the gas.

Power for the electrical discharge may be provided by a power supply providing a relatively short pulse of high voltage and current. The high voltage may be achieved by use of a Marx tank 48 charged by a charging power supply 50 to produce whatever voltage is desired. The Marx tank 48 is connected to a transmission line 52 to charge the line. The line 52 is connected through a switch 54 to a second transmission line 56 connected to the cathode 40. At an appropriate time, the switch 54 is closed to connect the transmission line 52 to the transmission line 56, whereupon the charge on the line 52 is transmitted through the line 56 to the cathode 40 and thence through the chamber 10.

The electrical discharge through the chamber 10 is synchronized with the operation of the electron gun 20 to assure that the electrical discharge occurs when the electron beam has appropriately ionized the gas. Synchronization may be effected by the trigger circuit 30 and delay circuits 32 and 58. Because it takes longer for the transfer of energy from the Marx tank 48 to the cathode 40 than from the Marx tank 26 to the electron gun 20, the Marx tank 48 is triggered first by a trigger pulse from the trigger circuit 30 which breaks down a discharge gap in the Marx tank 48 and places the tank in its high voltage mode. The trigger pulse is delayed by the delay circuit 58 to trigger the Marx tank 26 at the appropriate time thereafter. Thereafter the delay circuit 32 produces a further delayed pulse for triggering the discharge tube 34 to turn off the electron gun 20.

Application of the high voltage pulse to the line 56 is delayed by a time dependent upon the characteristics of the switch 54. The switch illustrated is a simple gaseous discharge device comprising two electrodes 59 and 60 spaced by confined gas at a predetermined pressure. As voltage builds up on the central conductor 62 of the line 52, voltage appears across the gap between the electrodes 59 and 60 as the central conductor 64 of the line 56 is essentially at ground potential. When this voltage reaches the breakdown potential of the gap, the gas breaks down, and the switch 54 becomes conductive with a relatively low impedance. The time delay for operation of the switch 54 depends upon the voltage developed at the electrode 59 and upon the breakdown potential of the gas in the switch. The voltage developed at the electrode depends upon the voltage developed by the Marx tank 48 and the impedances of the Marx tank 48 and the transmission line 52. The breakdown potential depends upon the particular gas used, its pressure and the spacing between the electrodes 59 and 60.

The apparatus described in connection with FIG. 2 has been designed to operate with a chamber 10 that is 10 cm × 10 cm square and 50 cm long, containing argon at atmospheric pressure and cyanogen bromide or other additives at a pressure of about 1 torr. The electron gun 20 is designed to provide 200 to 300 keV electrons at a current density of about 1 A/cm for about 0.5 μsec to ionize the gas in less than 1 μsec. Proper excitation of argon at 1 atmosphere may be achieved with a potential gradient of about 8000 V/cm. To excite about 0.1% of the argon particles within 0.1 μsec requires about 60 A/cm. The apparatus is, therefore, designed to produce about 80 kV at 30 kA for a period of about 0.1 μsec. The impedances of the lines 52 and 56 are designed to match the impedance of the chamber 10. An impedance of about 2 ohms is suitable for certain configurations and gases. This may be achieved with water dielectric coaxial lines with inner and outer diameters of 14 cm and 30 cm, respectively. The Marx generator 48 may comprise ten 50 kV, 0.25 μF capacitors.

The various delays have been designed so that upon the initiation of a trigger pulse by the trigger circuit 30, the Marx tank 48 is switched to its high voltage mode, whereupon charge is driven into the line 52 as a voltage pulse builds up in about 0.05 μsec. This pulse travels down the line 52 at a rate and with a pulse length dependent upon the parameters of the line including line length and the dielectric. Meanwhile, about 0.3 μsec. after the trigger pulse, the delay circuit 58 triggers the Marx tank 26 to initiate the electron beam. The beam ionizes the gas in the chamber 10 in about 0.2 to 0.3 μsec. At that time, the voltage pulse on the line 52 reaches the switch 54 and breaks down the gas therein, connecting the pulse to the line 56 and thence to the electrode 40. A 0.1 μsec pulse arrives at the cathode 40 as the ionization thereof by the electron beam has reached a suitable magnitude. The voltage thereupon appearing between the cathode 40 and the anode 23 accelerates the electrons in the chamber 10, producing further ionization and excitation of the argon, which thereupon radiates in the vacuum ultraviolet to excite the laser medium to an upper laser state.

Lesser energy input provides lesser excitation, and if the field is too low, the discharge may not be rapid enough to provide sufficient excitation in the time available. It is necessary that the excitation be fast compared to the rate of deactivating modes. On the other hand, the applied energy should not be so great as to get so many molecules in an excited state that they often hit one another and deactivate each other.

A number of variations in apparatus, gases, and parameters such as voltage, current, distance and time may be made within the scope of the present invention, as will be apparent to those skilled in the art. Other power supplies may be used. Further, various laser accoutrements may be used, depending upon the particular uses to which the laser beams are applied.

What is claimed is:

1. In a gas laser system, apparatus comprising
   means defining a laser chamber containing a mixture of noble gas and a molecular gaseous laser medium,
   said laser medium being relatively efficiently photodissociable by vacuum ultraviolet radiation to produce particles having an upper laser state from which they undergo transition to a lower laser state by laser action emitting pulses of coherent radiation of wave length longer than vacuum ultraviolet,
   said noble gas, when excited to a predetermined energy level, radiating vacuum ultraviolet radiation of frequency effectively photodissociating said medium to produce said particles in said excited state, and
   said laser medium being at a partial pressure a small fraction of the partial pressure of said noble gas, and
   electrical means coupled to said noble gas for producing electronic pulses in said mixture for exciting said noble gas to said predetermined energy level.

2. Apparatus according to claim 1 wherein said particles are resonantly excited directly into said upper laser state upon such photodissociation.

3. Apparatus according to claim 1 wherein said small fraction is between 0.01% and 1%.

4. Apparatus according to claim 1 wherein the partial pressure of said laser medium is between about 0.5 and 10 torr and the partial pressure of said noble gas is between about 0.5 and 10 atmospheres.

5. Apparatus according to claim 1 wherein said electrical means comprises an electron beam generator for introducing a pulse of electrons into said gas mixture, and high voltage means for producing an electrical discharge through said gas mixture subsequent to the introduction of said pulse of electrons.

6. In a gas laser system, apparatus comprising
   means defining a laser chamber containing a molecular gaseous laser medium,
   said laser medium being relatively efficiently photodissociable by vacuum ultraviolet radiation to produce molecules having an upper laser state from which they undergo transition to a lower laser state by laser action emitting pulses of coherent radiation of wave length longer than vacuum ultraviolet, said molecules in said lower laser state going promptly and spontaneously to an unbound state after said transition caused by said photodissociation, and
   means for effectively photodissociating said medium and producing said molecules in said excited upper laser state, said means including
   noble gas radiatively coupled to said laser medium and, when excited to a predetermined energy level, radiating such vacuum ultraviolet radiation, and
   electrical means coupled to said noble gas for producing electronic pulses in said mixture for exciting said noble gas to said predetermined energy level.

7. Apparatus according to claim 6 wherein the unbinding of said lower laser state is effected by collisionally induced predissociation.

8. Apparatus according to claim 6 wherein said molecules are halogen molecules.

9. Apparatus according to claim 8 wherein said halogen is bromine.

10. Apparatus according to claim 9 wherein said upper and lower laser states are the E and B states, respectively.

11. Apparatus according to claim 9 wherein said noble gas is argon.

12. Apparatus according to claim 6 wherein said noble gas is mixed with said gaseous laser medium with the partial pressure of said laser medium a small fraction of the partial pressure of said noble gas.

13. Apparatus according to claim 12 wherein said small fraction is between 0.01 and 1%.

14. Apparatus according to claim 12 wherein the partial pressure of said laser medium is between about 0.5 and 10 torr and the partial pressure of said noble gas is between about 0.5 and 10 atmospheres.

15. Apparatus according to claim 6 wherein said electrical means comprises an electron beam generator for introducing a pulse of electrons into said gas mixture, and high voltage means for producing an electrical discharge through said gas mixture subsequent to the introduction of said pulse of electrons.

16. In a gas laser system, apparatus comprising
means defining a laser chamber containing a mixture of noble gas and a molecular gaseous laser medium, said noble gas radiating in the vacuum ultraviolet when excited to a predetermined energy level, and
said laser medium being relatively efficiently photodissociable by said vacuum ultraviolet radiation to produce particles substantially resonantly excited directly into an upper laser state from which they undergo transition to a lower laser state by laser action emitting pulses of coherent radiation of wavelength longer than vacuum ultraviolet, and
electrical means coupled to said noble gas for producing electronic pulses for exciting said noble gas to said predetermined energy level.

17. Apparatus according to claim 16 wherein said noble gas is argon.

18. Apparatus according to claim 17 wherein said particles are CN.

19. Apparatus according to claim 18 wherein sad gaseous laser medium is CNBr.

20. Apparatus according to claim 16 wherein said noble gas is mixed with said gaseous laser medium with the partial pressure of said laser medium a small fraction of the partial pressure of said noble gas.

21. Apparatus according to claim 20 wherein said small fraction is between 0.01 and 1%.

22. Apparatus according to claim 20 wherein the partial pressure of said laser medium is between about 0.5 and 10 torr and the partial pressure of said noble gas is between about 0.5 and 10 atmospheres.

23. Apparatus according to claim 16 wherein said electrical means comprises an electron beam generator for introducing a pulse of electrons into said gas mixture, and high voltage means for producing an electrical discharge through said gas mixture subsequent to the introduction of said pulse of electrons.

24. A gas laser comprising
means defining a laser chamber containing a molecular laser medium including the radical CN,
means for dissociating said laser medium and producing a population inversion of particles of CN excited to the B state relative to the X state,
means for causing the excited CN particles to undergo transition to the X state by laser action with optical gain to produce pulses of coherent radiation of wavelength about 4000A.

25. In a gas laser system, apparatus comprising
means defining a laser chamber containing a halogen-comprising molecular gaseous laser medium,
said laser medium being excitable to produce halogen molecules having an ionic upper laser state from which they undergo transition to a covalent lower laser state by laser action emitting pulses of coherent radition of wavelength longer than vacuum ultraviolet,
said halogen molecules in said covalent lower laser state going promptly and spontaneously to an unbound state after said transition, and
means for producing a population inversion of said halogen molecules in said ionic upper laser state.

26. Apparatus according to claim 25 wherein the unbinding of said lower laser state is effected by collisionally induced predissociation.

27. Apparatus according to claim 25 wherein said halogen is bromine.

28. Apparatus according to claim 27 wherein said upper and lower laser states are the E and B states, respectively.

29. In a gas laser system, apparatus comprising
means defining a laser chamber containing a halogen-comprising molecular gaseous laser medium,
said laser medium being dissociable to produce halogen molecules having an ionic upper laser state from which they undergo transition to a covalent lower laser state by laser action emitting pulses of coherent radiation of wavelength longer than vacuum ultraviolet, said halogen molecules in said covalent lower laser state going promptly and spontaneously to an unbound state after said transition, and
means for photodissociating said medium to produce said halogen molecules and for exciting them to produce a population inversion of said halogen molecules in said ionic upper laser state.

30. Apparatus according to claim 29 wherein the unbinding of said lower laser state is effected by collisionally induced predissociation.

31. Apparatus according to claim 29 wherein said halogen is bromine.

32. Apparatus according to claim 31 wherein said upper and lower laser states are the E and B states, respectively, 33. A gas laser according to claim 24 wherein said means for dissociating comprises means for photodissociating said laser medium.

* * * * *